March 27, 1956 M. PERKINS 2,739,422
TREATMENT OF LIVE PLANTS FOR SHIPPING
Filed Dec. 7, 1954
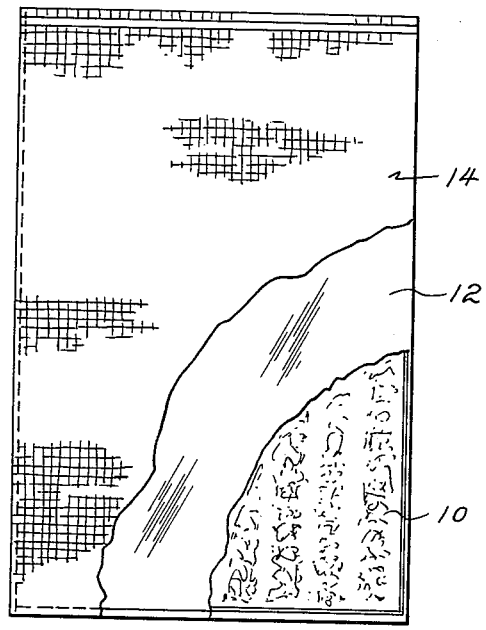
INVENTOR
MILO PERKINS
BY Strauch, Nolan + Diggins
ATTORNEYS

United States Patent Office 2,739,422
Patented Mar. 27, 1956

2,739,422

TREATMENT OF LIVE PLANTS FOR SHIPPING

Milo Perkins, Tucson, Ariz.

Application December 7, 1954, Serial No. 473,564

2 Claims. (Cl. 47—58)

The present invention relates to the treatment of live plants and especially to the treatment and packaging of grasses for shipment.

In recent years, new grasses have been developed which have very desirable properties. Many of these grasses either will not reproduce at all or will not reproduce true to type from seed. These grasses must be propagated vegetatively and, while my invention may be used with other grasses and plants, it is especially useful in the treatment and packaging of live grasses which must be propagated vegetatively.

One particularly desirable grass species which will not always reproduce truly from seed is Zoysia. At the present time, for example, Meyer–Z52 Zoysia is sold in the form of "plugs," that is, small pieces of turf or sod containing the live plants. These plugs are planted in spaced relation and the plants grow and fill in the spaces between the plugs.

It has been found that unless these plugs are planted fairly promptly the grasses die. If the plug dries, the grass dies from lack of moisture while if the plugs are too moist, the grass rots in a short period of time, particularly when packaged during transit. In addition, the plugs are relatively heavy, two square feet of plug area weighing as much as thirty pounds, so that shipping costs are high. Because of these inherent difficulties, the market for these grasses has been generally confined to relatively small areas in the immediate vicinity of the place where the grasses are grown.

I have found that the foregoing difficulties can be overcome and that grasses may be treated and preserved in bare root form so that the live plants may be shipped substantial distances.

One of the objects of the present invention is to provide a method of treating grass plants for shipment in bare root form.

Another object is to provide a method of treating live plants so that the plants may be preserved for relatively long periods of time without damage.

Another object is to provide a method of packaging live plants for shipment.

Another object is to provide an improved package for live plants.

These and other objects and advantages reside in novel features and in steps and treatments as will hereinafter be more fully set forth and pointed out in the appended claims.

Referring to the drawing the figure is a plan view of a package according to the present invention, with parts broken away.

In the practice of the present invention, the grass plants are removed from the ground and the soil is shaken from the roots. Generally I prefer to feed the plants 12 to 24 hours before removing them from the ground. The plants are then preferably washed to remove any remaining soil. I have found that when the plants are washed by soaking in still water, the soil is removed more quickly and completely.

After washing, the plants are dried quickly in a stream of moving air until the blades show definite signs of dehydration. The degree of drying will vary with different grasses and the limits are rather wide with any particular grass. The grass should not be dried to the extent that it is killed nor should it be left so damp that it will rot in shipment. Grasses such as Zoysia, whose root structures contain substantial amounts of moisture may be dried to a greater extent than Bermuda or bent grasses whose hair roots contain less internal moisture. When drying grasses having a hair root structure with little internal moisture, the succulent blades should be well dried but the roots should be protected from the drying air stream and should remain slightly moist to the touch. This precaution is not so necessary where the root structure of the grass stores a greater quantity of internal moisture before dehydration.

The drying is sufficient when the blades of the grass show dehydration. Zoysia grasses show dehydration by a curling or "pencilling" of the blades and other grasses may show dehydration by a slight withering of the blades.

The drying is preferably done rapidly, in about fifteen minutes to thirty minutes and this requires moving air of very low humidity. In the arid portions of the southwestern part of the United States, the normal dry winds are usually sufficient to dry the grasses properly but the grasses should be protected from the direct rays of the sun. In other less arid locations it may be necessary to reduce the humidity of the air and to employ fans for circulation.

After drying, the grass blades appear withered and the grass is ordinarily packaged immediately. The package should be such that the grass will retain its remaining moisture but be free to breathe.

Various plastic and other materials are known which are relatively impervious to moisture while being gas pervious. These materials will thus retain the moisture of the plant while permitting passage of the respiratory gases so that there is no serious interference with the breathing of the plant.

I prefer to use polyethylene sheet material for the package because in addition to the moisture and gas properties, it has the further property of transparency. The polyethylene should be very thin. A 1.5 mil thickness gives excellent results while a 2.0 mil thickness does not permit the passage of gases as freely as is desirable. Other plastics may also be used and the plastics sold by the Goodyear Tire and Rubber Company under the name "250 gauge P9 vitafilm" and that sold by The Goodrich Company under the name "vinyl film," have been suggested as having these properties.

The dried plants are wrapped in the plastic or other material and the material is closed. The material could be heat sealed if desired but I have found that stapling, twisting the plastic liner and tying with a rubber band, or otherwise fastening the material is sufficient. The wrapped plants are then enclosed in a fabric bag which preferably has relatively large open meshes to permit the entry of light to the wrapped plants. The drawing shows the completed package in which 10 designates the plants, 12 the transparent wrapping material and 14 the open mesh bag. The dehydrated bare root plants equivalent to two square feet of sod or plugs weigh only twenty-four ounces.

If the plants have been properly dehydrated and properly packaged, small beads of moisture appear on the inner surface of the wrapping material after a few hours. The plants then recover a "live" appearance and the leaves or blades resume their green color. Live plants packaged in this way have been successfully shipped to the far corners of the United States and have remained alive, healthy and green in packages for more than thirty days.

From the foregoing it will be apparent that I am able to accomplish the objects of my invention and provide a method of treating and packaging live plants and a package by which live plants may be shipped over long distances or stored for long periods of time. While I have described the invention for the treatment of grasses, other plants may be handled in the same way. Various modifications may also be made in the process without departing from the spirit of my invention or the scope of the appended claims.

I claim:

1. The method of treating Zoysia grasses for shipment which comprises removing the Zoysia from the earth, washing the soil from the roots, quickly drying the Zoysia in a stream of moving gas of low humidity until the blades "pencil," wrapping the dried Zoysia in a sheet material which is pervious to gases and substantially impervious to moisture and substantially sealing said sheet material.

2. The method of treating grasses of the type having only fine hair roots which comprises removing the grass from the earth, washing the soil from the roots, quickly drying the grass in a stream of gas of low humidity until the blades show signs of dehydration, protecting the roots from the gas during drying, wrapping the dried grass in sheet material which is pervious to gases but substantially impervious to moisture and substantially sealing the sheet material around the grass.

References Cited in the file of this patent

UNITED STATES PATENTS

| | | |
|---|---|---|
| 2,235,950 | St. John | Mar. 25, 1941 |
| 2,572,473 | Grove | Oct. 23, 1951 |

OTHER REFERENCES

Modern Packaging, vol. 17, No. 2, pp. 103–107 (Oct. 1943), article on "Pliofilm."